(12) United States Patent
O'Rourke et al.

(10) Patent No.: US 7,089,328 B1
(45) Date of Patent: *Aug. 8, 2006

(54) METHOD ALLOCATION SCHEME FOR MAINTAINING SERVER LOAD BALANCERS SERVICES IN A HIGH THROUGHPUT ENVIRONMENT

(75) Inventors: Chris O'Rourke, Apex, NC (US); Barron C Housel, Chapel Hill, NC (US); Robert M Batz, Raleigh, NC (US); Steven C Klein, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 842 days.

This patent is subject to a terminal disclaimer.

(21) Appl. No.: 09/781,522

(22) Filed: Feb. 8, 2001

Related U.S. Application Data (63) Continuation of application No. 09/751,317, filed on Dec. 29, 2000, now abandoned.

(51) Int. Cl.
*G06F 15/16* (2006.01)

(52) U.S. Cl. .................. 709/245; 709/201; 709/214; 709/215

(58) Field of Classification Search .............. 709/225, 709/245, 201; 711/100, 207; 370/392
See application file for complete search history.

(56) References Cited

U.S. PATENT DOCUMENTS

| | | | |
|---|---|---|---|
| 5,559,980 A * | 9/1996 | Connors et al. | 711/100 |
| 5,636,216 A * | 6/1997 | Fox et al. | 370/402 |
| 5,774,660 A * | 6/1998 | Brendel et al. | 709/201 |
| 5,793,763 A * | 8/1998 | Mayes et al. | 370/389 |
| 5,860,082 A * | 1/1999 | Smith et al. | 711/103 |
| 5,862,452 A | 1/1999 | Cudak et al. | |
| 5,899,994 A * | 5/1999 | Mohamed et al. | 707/100 |
| 6,006,264 A * | 12/1999 | Colby et al. | 709/226 |
| 6,006,272 A | 12/1999 | Aravamudan et al. | |
| 6,038,233 A * | 3/2000 | Hamamoto et al. | 370/401 |
| 6,055,236 A | 4/2000 | Nessett et al. | |
| 6,058,431 A * | 5/2000 | Srisuresh et al. | 709/245 |
| 6,125,430 A * | 9/2000 | Noel et al. | 711/152 |
| 6,154,839 A * | 11/2000 | Arrow et al. | 713/154 |
| 6,178,455 B1 * | 1/2001 | Schutte et al. | 709/228 |
| 6,212,613 B1 * | 4/2001 | Belair | 711/207 |
| 6,243,720 B1 * | 6/2001 | Munter et al. | 707/206 |
| 6,266,707 B1 | 7/2001 | Boden et al. | |
| 6,286,089 B1 * | 9/2001 | Greiner et al. | 711/203 |
| 6,353,614 B1 | 3/2002 | Borella et al. | |

(Continued)

OTHER PUBLICATIONS

Hossain, "Policy-Based Network Load Management", Bell Labs Technical Journal, Oct.-Dec. 99, vol. 4, Issue 4, p. 95, 14p.*

(Continued)

*Primary Examiner*—Rupal Dharia
*Assistant Examiner*—Kristie D. Shingles
(74) *Attorney, Agent, or Firm*—Baker Botts L.L.P.

(57) ABSTRACT

An improved client network address translation ("NAT") system is provided. A memory allocation scheme is provided for initializing connection control blocks with the client NAT addresses when a storage pool of connection control blocks are allocated. This avoids the costly overhead as connections are created and destroyed. Unlike the prior art solutions, once the connection control blocks of the present invention are allocated, they remain in effect until the storage subpool is deleted. Secondly, the allocation scheme enables a large pool of client NAT addresses and reclaim client NAT addresses as subpools are allocated and freed.

20 Claims, 7 Drawing Sheets

U.S. PATENT DOCUMENTS

| | | | |
|---|---|---|---|
| 6,442,662 B1* | 8/2002 | Komatsu | 711/202 |
| 6,457,061 B1* | 9/2002 | Bal et al. | 709/245 |
| 6,470,436 B1* | 10/2002 | Croft et al. | 711/206 |
| 6,477,612 B1* | 11/2002 | Wang | 711/2 |
| 6,510,496 B1* | 1/2003 | Tarui et al. | 711/147 |
| 6,567,405 B1 | 5/2003 | Borella et al. | |
| 6,574,737 B1 | 6/2003 | Kingsford et al. | |
| 6,615,357 B1 | 9/2003 | Boden et al. | |
| 6,618,799 B1* | 9/2003 | Hagersten | 711/202 |
| 6,650,641 B1* | 11/2003 | Albert et al. | 370/392 |
| 6,725,321 B1* | 4/2004 | Sinclair et al. | 711/103 |
| 6,765,920 B1* | 7/2004 | Tari et al. | 370/401 |
| 6,813,645 B1* | 11/2004 | Meyer | 709/245 |
| 6,904,039 B1* | 6/2005 | Hung et al. | 370/390 |

OTHER PUBLICATIONS

Nishida et al, "Network Architecture Using Network Address Translation Mechanism for Network and Unidirectional Links", Electronics and Communications in Japan, 2000, Part 1, vol. 83, No. 12.*

U.S. Appl. No. 09/780,755, entitled "Preallocation of Client Network Address Translation Addresses for Client-Server Networks," filed Feb. 8, 2001 with drawings, 34 total pages.

* cited by examiner

| CNP | Field Symbol | Field Name | Source |
|---|---|---|---|
| 304 | PNAME | Pool Name | Input |
| 306 | FIPA | First IP Address | Input |
| 308 | LIPA | Last IP Address | Input |
| 310 | NETMASK | Net Mask | Input |
| 312 | ICONNS | Initial Num. Connection Blocks | Input |
| 314 | MCONNS | Max Num. Connection Blocks | Input |
| 316 | MPA | Memory Pool Address | NULL derived |
| 318 | ILA | Interval List Address | Derived |

METHOD ALLOCATION SCHEME FOR MAINTAINING SERVER LOAD BALANCERS SERVICES IN A HIGH THROUGHPUT ENVIRONMENT

CROSS REFERENCE TO RELATED APPLICATIONS

This application claims priority to U.S. application Ser. No. 09/751,317, filed Dec. 29, 2000, now abandoned, entitled "Method Allocation Scheme for Server Load Balancers Services in a High Throughput Environment". This application also relates to and was filed concurrently with U.S. Patent Application Ser. No. 09/780,755 filed Feb. 8, 2001, entitled "Preallocation of Client Network Address Translation Addresses for Client-Server Networks".

TECHNICAL FIELD OF THE INVENTION

The present invention is related to computer networking devices. More specifically, the present invention is related to address translation systems for mapping local Internet Protocol "IP" addresses used by hosts on a private network to globally unique IP addresses for communication with hosts on the Internet.

BACKGROUND OF THE INVENTION

Private networks are commonly connected to the Internet through one or more routers so that hosts (PCs or other arbitrary network entities) on the private network can communicate with nodes on the Internet. Typically, the host will send packets to locations both within its private network and on the Internet. To receive packets from the Internet, a private network or a host on that network must have a globally unique 32-bit IP address. Each such IP address has a four octet format. Typically, humans communicate IP addresses in a dotted decimal format, with each octet written as a decimal integer separated from other octets by decimal points.

Global IP addresses are issued to enterprises by a central authority known as the Internet Assigned Number Authority ("IANA"). The IANA issues such addresses in one of three commonly used classes. Class A IP addresses employ their first octet as a "netid" and their remaining three octets as a "hostid." The netid identifies the enterprise network and the hostid identifies a particular host on that network. As three octets are available for specifying a host, an enterprise having class A addresses has 224 (nearly 17 million) addresses at its disposal for use with possible hosts. Thus, even the largest companies vastly under use available class A addresses. Not surprisingly, Class A addresses are issued to only very large entities such as IBM and ATT. Class B addresses employ their first two octets to identify a network ("netid") and their second two octets to identify a host ("hostid"). Thus, an enterprise having class B addresses can use those addresses on approximately 64,000 hosts. Finally, class C addresses employ their first three octets as a netid and their last octet as a hostid. Only 254 host addresses are available to enterprises having a single class C netid.

Unfortunately, there has been such a proliferation of hosts on the Internet, coupled with so many class A and B licenses issued to large entities (who have locked up much address space), that it is now nearly impossible to obtain a class B address. Many organizations now requiring Internet access have far more than 254 hosts—for which unique IP addresses are available with a single class C network address. It is more common for a mid to large size enterprise to have 1000 to 10,000 hosts. Such companies simply can not obtain enough IP addresses for each of their hosts.

To address this problem, Network Address Translation ("NAT") has been proposed. See K. Egevang and P. Francis, "The IP Network Address Translator (NAT)," Request For Comments "RFC" 1631, Cray Communications, NTT, May 1994 which is available at http://andrew2.andrew.cmuedu/rfc/rfc1631.html and is incorporated herein by reference for all purposes. NAT is based on the concept of address reuse by private networks, and operates by mapping the reusable IP addresses of the leaf domain to the globally unique ones required for communication with hosts on the Internet. In implementation, a local host wishing to access the Internet receives a temporary IP address from a pool of such addresses available to the enterprise (e.g., class C 254 addresses). While the host is sending and receiving packets on the Internet, it has a global IP address which is unavailable to any other host. After the host disconnects from the Internet, the enterprise takes back its global IP address and makes it available to other hosts wishing to access outside networks.

Figure 1:
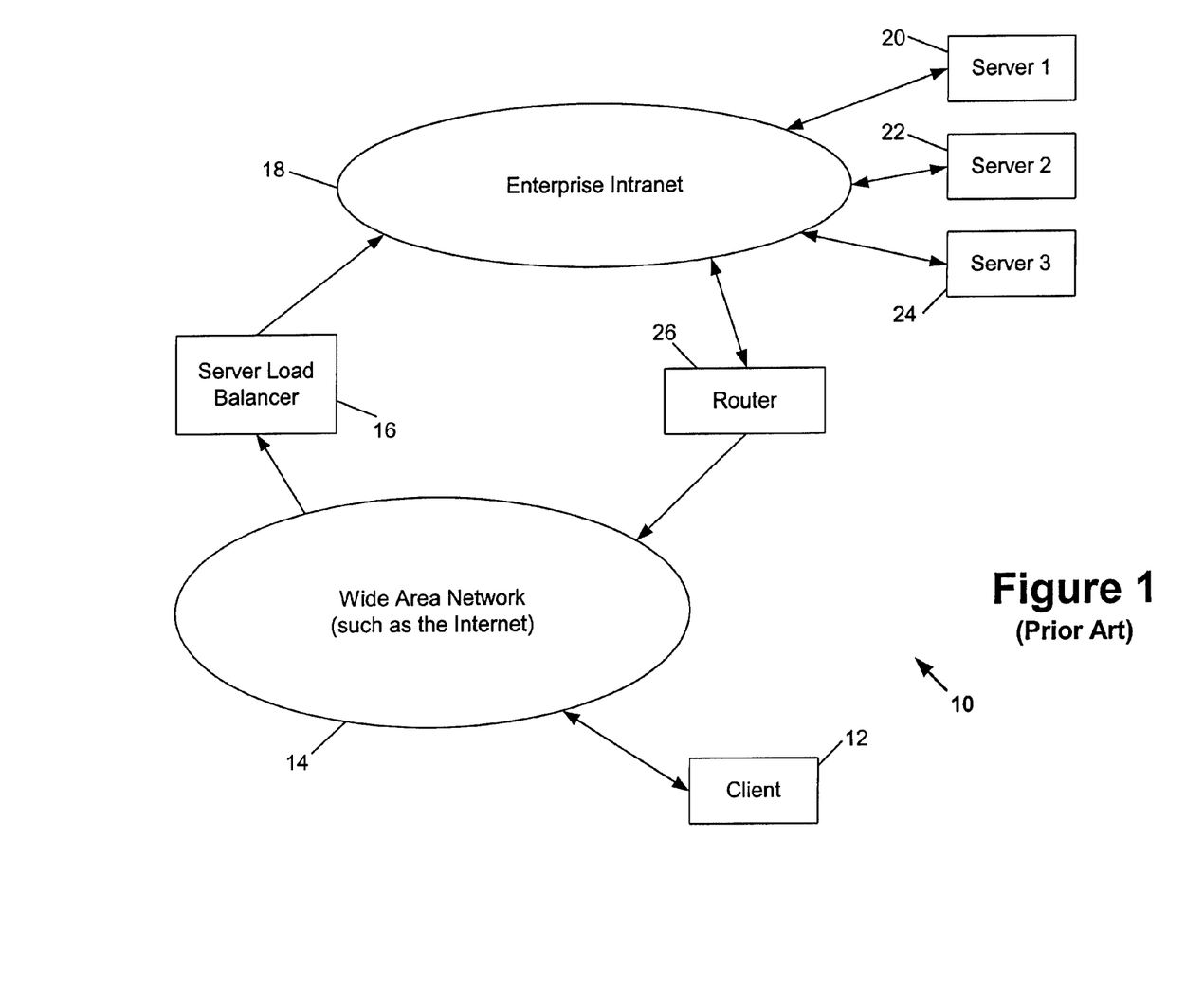
FIG. 1 is a schematic block diagram of a prior art network configuration.

To implement NAT, a translation system must be provided between the enterprise private network and the Internet. Unfortunately, as the translation system is positioned between the enterprise and the Internet, communication performance can be degraded if NAT is not performed efficiently. FIG. 1 illustrates a typical prior art Internet/Enterprise computer network configuration 10, where a server load balancer is used to distribute requests to different servers in the intranet 18. In this case, client NAT is necessary to force all responses to be returned to the server load balancer. In this example, client 12 issues a request from the Enterprise organization. The client's request designates a source IP address "C"(S=C) and a virtual server IP address "V" (D=V). The client's request is transmitted to the Internet 14 and arrives at the Enterprise's server load balancer 16. The server load balancer 16 translates both the source and destination IP address to "N1" and "R1," respectively. "R1" is the IP address of one of the real servers 20, 22, or 24 chosen by the server load balancer. "N1" is a generated IP address that is advertised within the intranet 18 so that routing tables (of network devices within the intranet 18) are updated to cause all responses sent to "N1" to be routed to the server load balancer. This is necessary because the server load balancer must maintain connection state information and perform a reverse translation. The translation of the C to "N1" is called client NAT. The server load balancer 16 then routes the request to "R1" (say 20). Server 20 generates a response to the request causing it to be routed to the server load balancer 16. Before the response can be routed to the client, the server load balancer must reverse the translation. "N1" is translated to "C" and "R1" is translated to "V." The source address of the response message is set to "V" (S=V) and the destination address is set to "C" (D=C). If client NAT were not employed, the response could be routed to router 26, resulting in network errors.

A major source of overhead of the NAT translation process is the allocation and management of client NAT addresses and their associated address pools each time a new address is required for each new connection that is initiated by the client device. Prior art solutions to this problem have either required substantial hardware resources or have otherwise created a bottleneck between the enterprise private network and the Internet. There is, therefore, a need in the art for providing a NAT that consumes fewer resources and yet provides faster performance.

SUMMARY OF THE INVENTION

In accordance with the present invention, the disadvantages and problems associated with prior art client NAT systems have been substantially reduced or eliminated. In particular, performance of the client NAT system is greatly enhanced.

In accordance with one embodiment of the present invention, a faster client NAT system is provided. Specifically, an embodiment of the present invention reduces computational overhead by initializing (internal) connection control blocks with the client NAT addresses when a storage pool of connection control blocks are allocated. This avoids the costly overhead as connections are created and destroyed. Unlike the prior art solutions, once the connection control blocks of the present invention are allocated, they remain in effect until the storage subpool is deleted.

Alternate embodiments of the present invention provide additional methods for using intervals to allocate and reclaim client NAT addresses as subpools are allocated and freed. These methods enable as large a pool of client NAT addresses as possible during the operation of the present invention.

These and other features and advantages of the present invention will be presented in more detail in the following specification of the invention and the figures.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

1. Definitions

The following are terms that are used in the instant specification. Their definitions are provided to assist in the understanding of the embodiments that are described herein.

A "packet" is a collection of data and control information including source and destination node addresses and source and destination ports.

A "router" is a piece of hardware or software which operates at the network layer to direct packets between various nodes of one or more networks. The network layer generally allows pairs of entities in a network to communicate with each other by finding a path through a series of connected nodes.

A "client" is a PC or other arbitrary network entity residing on a network and capable of communicating with entities outside of its own network through a router or bridge.

A "server" is a node to which client requests are sent to execute a service.

A "server load balancer" is network device that receives connection requests and distributes them to servers in a server farm.

A "server farm" is a collection of servers.

A "virtual server" is a server farm identified by a single IP address called a virtual IP address.

A "virtual IP address" is an address defined at a server load balancer that is used to intercept flows that are to be directed to one of the servers in a server farm.

A "flow" is a five-tuple consisting of: source node IP address, source port number, destination node IP address, destination port number, and protocol number.

A "connection" is a pair of flows that define the traffic pattern of data sent between a given client and server. From the perspective of the client, the source and destination addresses and the source and destination ports of the response flow are reversed from those of the request flow.

A "connection control block" is a control block allocated by a server load balancer to manage a connection.

A "client NAT address" is the combination of an IP address and a port number. The IP address and port number of a client request are translated to a client NAT address by the server load balancer.

A "client NAT address range" is a sequenced set of client NAT addresses from which a client NAT address is drawn for the client NAT function.

2. Overview

Once the volume of Internet traffic grew to substantial levels, single servers proved to be a single point of failure. As a remedy, servers are now clustered to form a server farm. Server load balancers provide a means for evenly distributing work among servers in the server farm with scalability and redundancy.

The method and apparatus of the present invention concerns the allocation and deallocation of client NAT address ranges. The apparatus and method of the present invention can be implemented in hardware or software, or any combination there between. At the beginning of the process of defining the client NAT address range, at least one subpool is allocated. During the subpool allocation process, a special sub-process is called to assign client NAT addresses and register the allocated subpool. Upon termination (deletion) of the subpool, a termination routine is called to return addresses to the client NAT address range.

Load balancing devices utilize a database of active connections having a pair of flows and client NAT address information. When a packet is received, a check is made in the connection database for an entry corresponding to the packet's flow information. If no match is found, a connection object is allocated from the connection control block pool. Next, the client NAT address is either calculated or retrieved from a pool of preallocated client NAT addresses. The latter option is faster in practice, but results in poorer utilization of memory resources because a separate memory pool of client NAT addresses is required. After the client NAT address is allocated, the connection object is added to the active connection database.

An embodiment of the present invention utilizes a connection control block pool comprised of connection objects that already contain client NAT address information. Unlike the prior art, the present invention reduces computational overhead by initializing the connection control blocks with the client NAT addresses when a storage pool of connection control blocks is allocated. This avoids the costly overhead as connections are created and destroyed. Moreover, unlike the prior art solutions, once the connection control blocks of the present invention are allocated, they remain in effect until the storage subpool is deleted.

With respect to the connection database, there are five specific pieces of information in each flow: the destination IP address; the source IP address; the destination port number; the source port number; and the protocol (such as TCP or UDP, although other protocols may be identified). Using the client NAT of the present invention, an example inbound flow and an example outbound flow are compared in Table 1.

TABLE 1

| From Client (Inbound) | From Server (Outbound) |
|---|---|
| Server IP = V | Server IP = $R_1$ |
| Client IP = C | Client IP = $N_1$ |
| Server Port = 80 | Server Port = 80 |
| Client Port = 15000 | Client Port = 48123 |
| Protocol = TCP | Protocol = TCP |

It should be noted that the "Client IP" and "Client Port" rows in Table 1 in the "From Server" column are values that are pre-populated.

Figure 2:
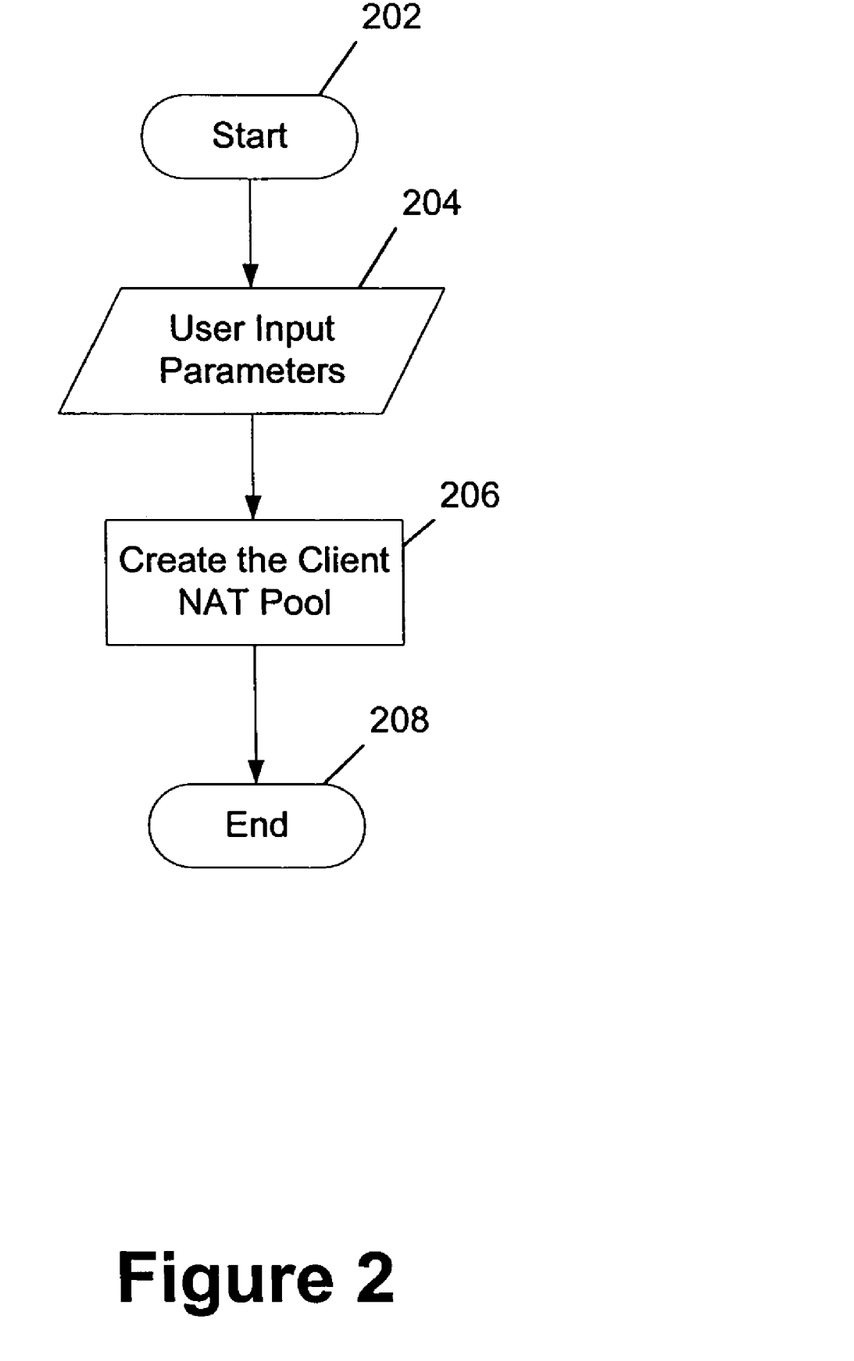
FIG. 2 is a flowchart of a method to create a client NAT range of an embodiment of the present invention.

Typically, a client NAT address range is used for connections to all of the servers in a given server farm. The first client NAT address range is allocated when the server farm is brought into service as illustrated in FIG. 2. An interval list is kept in NAT address order. However, this interval list can be collapsed when subpool associated with the client NAT address range is deleted but not when a connection control block is deallocated. This ensures efficient allocation of client NAT addresses, especially during storage allocation. Moreover, as no client NAT allocation/deallocation occurs during the connection creation/termination phases, overall system performance is enhanced.

3. Example Embodiments

FIG. 2 is a flowchart of the method of creating a client NAT address range configuration from user-specified input parameters. As illustrated in FIG. 2, the process begins at step 202. Next, in step 204, the user inputs the initial parameters. Next, in step 206, the client NAT address range is created and the method ends in step 208. The creation procedure, step 206, creates an internal control block (shown in FIG. 3) that represents the client NAT address range for its lifetime within a device, such as, for example, a router. When the configuration has been completed, the specification of the client NAT address range has been constructed but no memory for the objects has been allocated.

Figure 3:
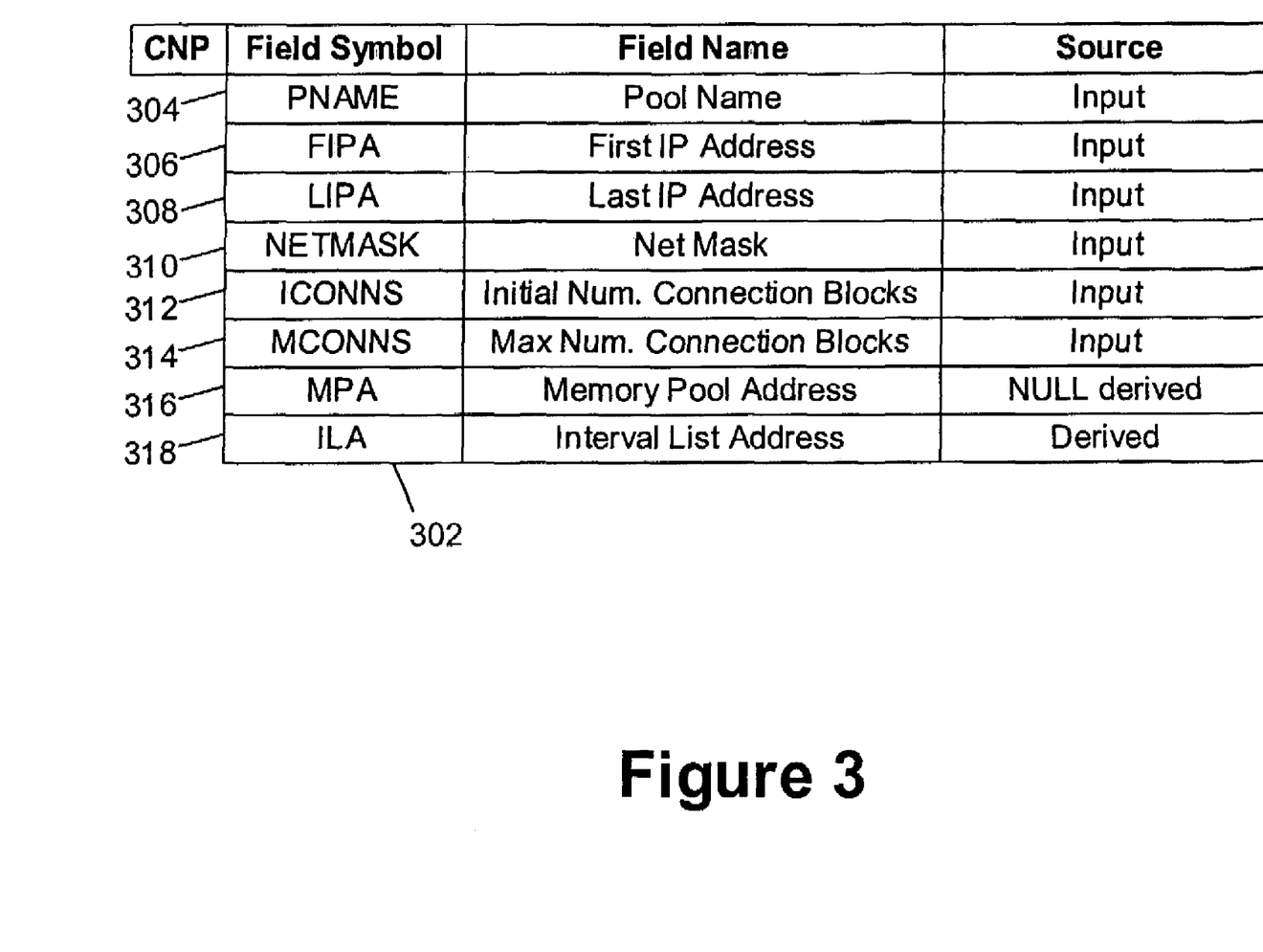
FIG. 3 is a block diagram of an internal connection control block object of an embodiment of the present invention.

FIG. 3 is a block diagram of the internal control block of an embodiment of the present invention. The internal control block, indicated generally at 302, contains a set of properties 304–318. The pool name 304 includes a field symbol illustratively designated as "PNAME," that is provided from the user input. Note that multiple client NAT address ranges can be created, if desired, for different virtual servers. The first and last IP addresses FIPA 306 and LIPA 308, respectively, are also provided by user input as is the net mask NETMASK 310. In addition, the user also inputs the initial number of connection blocks ICONNS 312 and the maximum number of connection blocks MCONNS 314. Finally, FIG. 3 illustrates two derived fields: the memory pool address (MPA) 316 and the interval list address (ILA) 318. MPA 316 is the address of the memory pool that is allocated by the memory manager for the client NAT address range. The MPA 316 is assigned when the memory pool is allocated.

Figure 7:
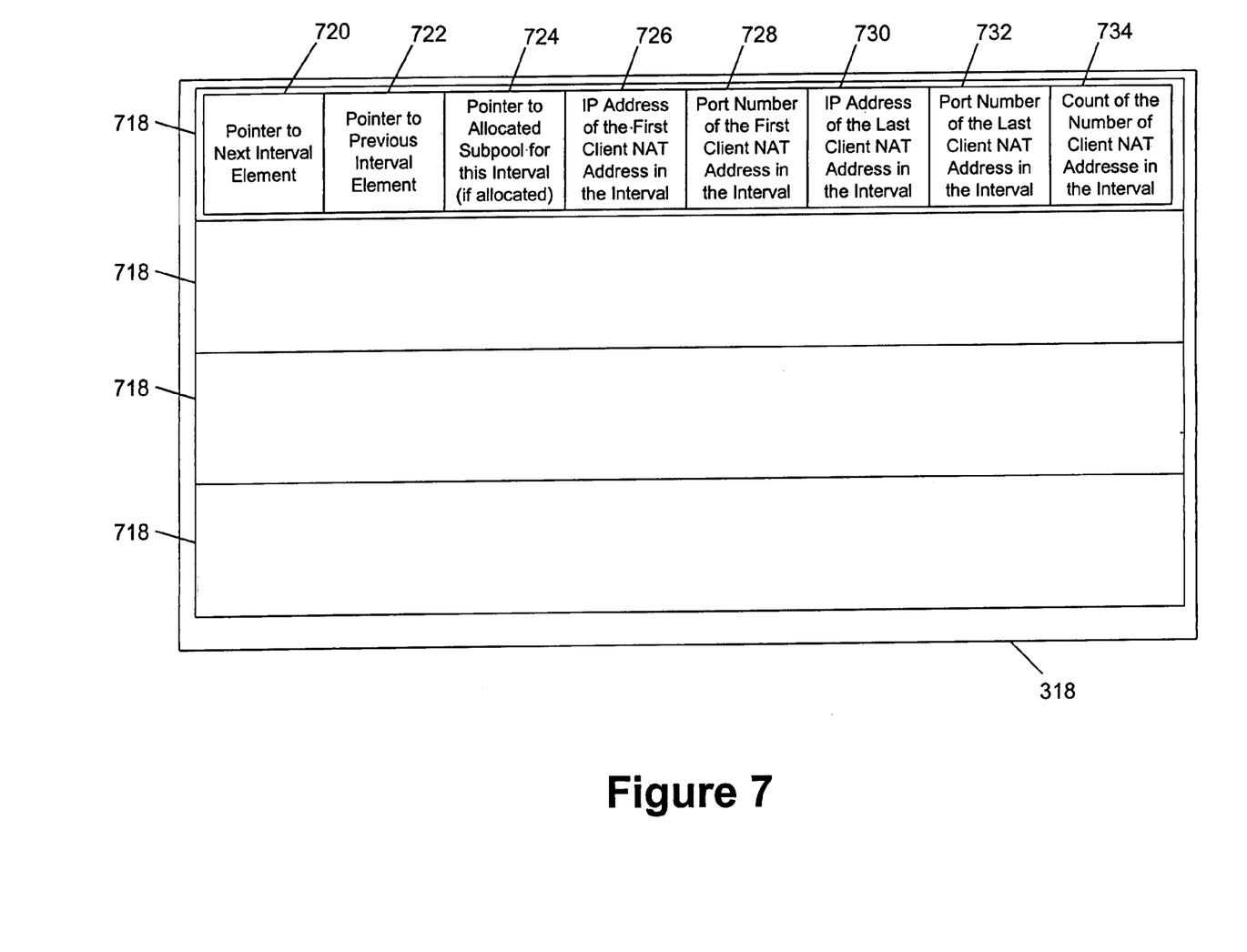
FIG. 7 is a block diagram of an increment list element of the present invention.

The interval list address (ILA) 318 is a pointer to an interval list that is used to keep track of free and allocated client NAT addresses and the associated subpools that are allocated. The ILA 318 consists of a sequence of interval list elements (ILE's) 718 as shown in FIG. 7. The ILA 318 points to a list object that contains the head and tail pointer of the list and a count of the number of elements within the list. In this way, the ILA 318 is more appropriately termed an interval list pointer. As will be appreciated by those skilled in the art, there are numerous ways to accomplish the goals of the ILA 318.

As illustrated in FIG. 7, each ILE 718 contains a pointer to the next interval element 720, a pointer to the previous interval element 722, a pointer to the allocated subpool for this particular interval 724. However, the pointer 724 is set to 0 (zero) if the addresses are not allocated. In addition, the ILE 718 also contains the IP address of the first client NAT address in the interval 726, the port number of the first client NAT address in the interval 728, the IP address of the last client NAT address in the interval, the port number of the last client NAT address in the interval 732, and the count of the number of client NAT addresses in the interval 734. The counter 734 is used to iterate through the subpool upon initialization of the connection blocks with the client NAT addresses. While the count value could have been computed from the starting and ending client NAT IP addresses 726 and 730, respectively, it is convenient to store this value to provide faster performance at runtime. Initially, before the memory pool is allocated, there is a single ILE 718 that covers the entire range with the subpool address set to zero, designating that the addresses are unallocated.

Figure 4:
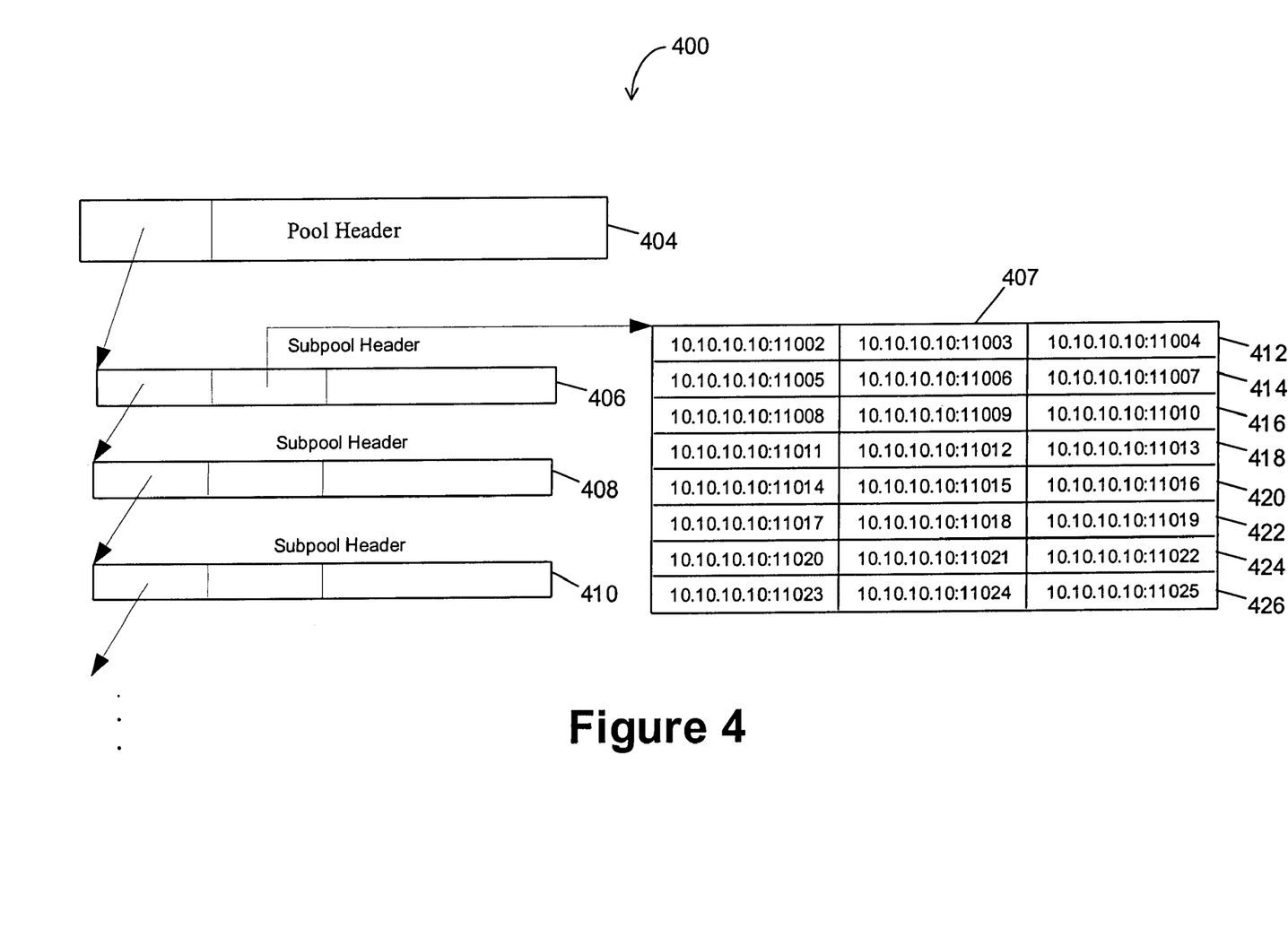
FIG. 4 is a block diagram of an embodiment of the memory pool of the present invention.

FIG. 4 illustrates a general memory allocation model of the present invention. The present invention provides a general mechanism for passing one procedure that is to be invoked when a memory block is allocated and another procedure that is to be invoked when a memory block is deallocated.

The general configuration of the memory pool 400 is shown in FIG. 4. A main pool header 404 is provided for the memory pool 400. Subpool headers 406, 408, 410, etc., are constructed whenever a block of memory is allocated. Subpools may continue to be allocated whenever more memory is needed. However, allocation is allowed only up to a fixed configured maximum (determined by the parameter MCONNS 314 of FIG. 3). Fixed block storage 407 contains a set of fixed blocks 412, 414, 416, 418, 420, 422, 424, and 426 that illustrate the allocation of a fixed block of storage whenever a new subpool is allocated.

The fixed block storage 407 of FIG. 4 also illustrates the sequence of fixed-length blocks (e.g., blocks 412–426) that are allocated within the subpool memory block. In this embodiment of the present invention, each of these blocks 412–426 correspond to a connection block used for server load balancing (SLB). The populated IP addresses and port numbers in the blocks 412–426 illustrate assignments of the client NAT addresses to the connection blocks that are contained within the subpool memory. A given connection block may be free (e.g., chained in a free list) or allocated. However, the client NAT addresses remain allocated and preserved in the subpool memory until the entire subpool is freed.

Figure 5:
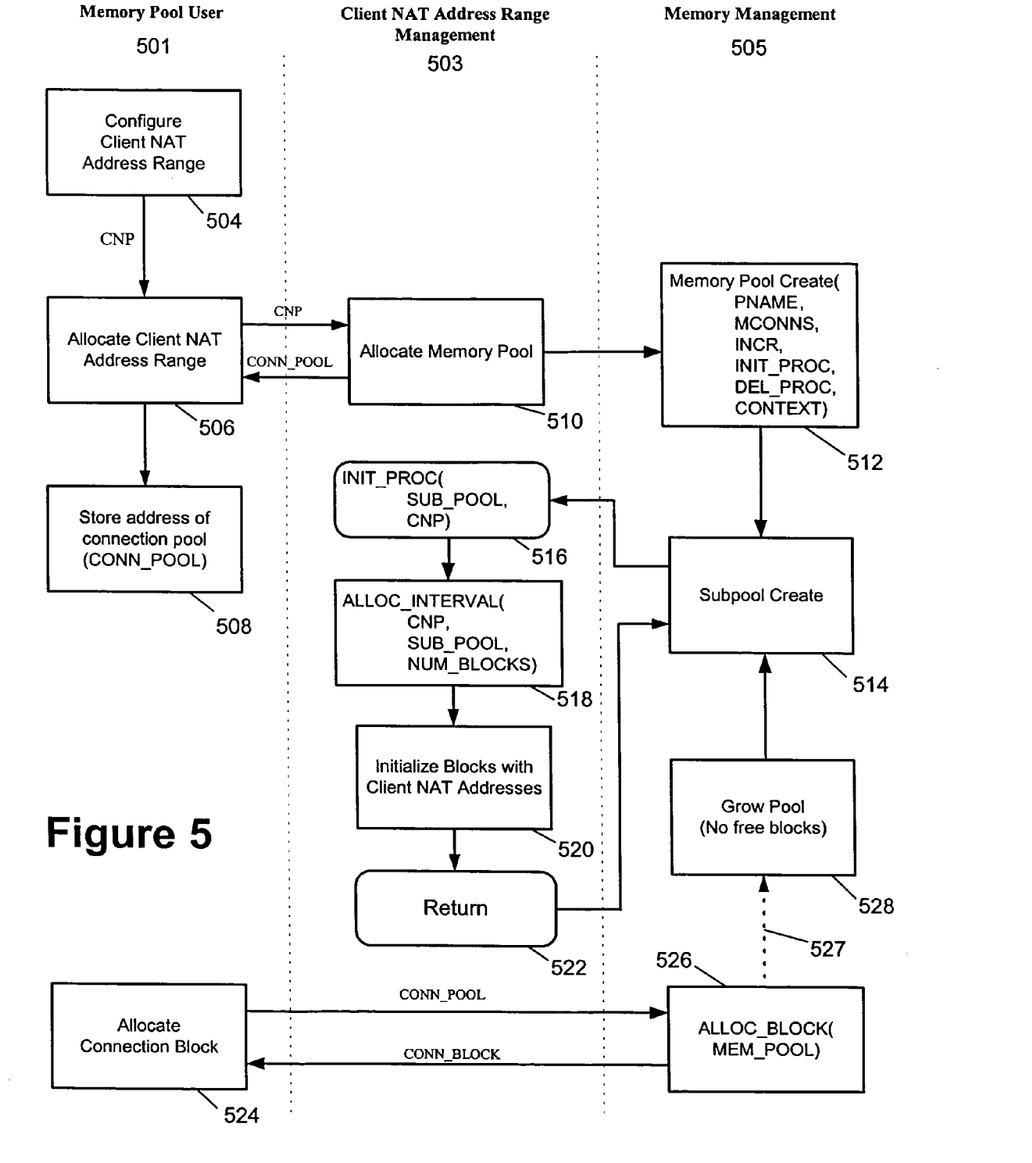
FIG. 5 is a block diagram of a memory allocation method of an embodiment of the present invention.

FIG. 5 illustrates the allocation of the client NAT address range and connection block. As shown in FIG. 5, there are three main functions in this allocation method, specifically the memory pool user function 501, the client NAT address range management function 503, and the memory management function 505. Each of these functions 501, 503, and 505 have various tasks in conjunction with the memory allocation process of the present invention. In this embodiment of the present invention, the memory pool user 501 is the IOS Server Load Balancer (SLB) function.

The process begins in step 504, where the user invokes the procedure to configure a client NAT address range. Specifically, a client NAT address range pointer (CNP 302 of FIG. 3) for the configuration is generated and returned in step 504. Next, in step 506, a procedure is invoked to allocate the memory for the client NAT address range, having been passed the client NAT address range pointer so that the client NAT address range parameters are available. In step 508, the address of the allocated memory pool (illustratively labeled "CONN POOL," discussed below) is returned from step 506 and is saved by the server load balancer for the life of the pool. This address will be used in the allocation step 526 of FIG. 5 and the free connection blocks step 604 of FIG. 6.

In step 510, another procedure is used to invoke the memory management function 505 in order to allocate the memory pool. Initially, a single subpool is allocated. In step 512, the client NAT address range parameters are passed on to the memory manager 505 as well as the illustratively labeled initialization procedure "INIT_PROC" of step 516, the illustratively labeled delete procedure "DEL_PROC" of step 612 (of FIG. 6), and the illustratively labeled CONTEXT parameter. A pointer to the client NAT address range configuration is passed as the CONTEXT value. The initialization procedure "INIT_PROC," and delete (destroy) procedure "DEL_PROC," and the CONTEXT values and parameters are then saved in the pool header.

After the memory pool has been created, execution continues to step 514 as illustrated in FIG. 5. In step 514, a subpool header and its associated subpool memory is allocated. Next, moving back into the client NAT range management function 503 where step 516 is performed. In step 516, the initialization procedure, illustratively labeled "INIT_PROC" is invoked for initializing the connection blocks allocated within the subpool memory. A pointer to the subpool header 406 (of FIG. 4, illustratively labeled "SUB_POOL") and the client NAT address range configuration pointer (CNP 302 of FIG. 3) are passed to the procedure as parameters.

In step 518, the interval list elements (ILE's) 718 (of FIG. 7) are used to manage ranges of allocated and free client NAT address ranges. Specifically in step 518, the interval list elements are allocated using the configuration range pointer (CNP), the subpool header ("SUB_POOL") and a parameter specifying the number of blocks ("NUM_BLOCKS"). As new subpools are allocated, the list expands. Conversely, when subpools are freed, the interval list shrinks. An ILE 718 is allocated and inserted into the interval list 318 in the client NAT address range configuration. The ILE 718 contains a range of client NAT addresses (specifically the starting IP address 726 and the ending IP address 730) and a non-NULL subpool pointer to the allocated subpool (subpool header address 724) if the client NAT addresses are allocated. The interval list 318 is maintained in client NAT address order. In step 520, each connection control block is assigned successive client NAT addresses defined by the range in the ILE. Once assigned, these addresses remain until the subpool is freed. In step 522, execution is returned to the memory manager 505 to finalize step 514.

Within the memory manager 505, a condition may arise when the server load balancer has allocated all the connection blocks contained in the subpool. The dashed arrow 527 illustrates that when the number of free blocks reaches a minimum threshold, the "grow pool" procedure of steps 514 and 528 are invoked to create another subpool. In step 524, the calling server load balancer requests allocation of a connection block. In step 526, the memory manager 505 selects a block from the free list and returns its address (CONN_BLOCK) to the calling server load balancer. Recall that the client NAT address range is pre-assigned when the memory pool is allocated, the server load balancer never has to incur the overhead of allocating a client NAT address on a per connection basis after the subpool is created. This feature of this embodiment of the present invention precludes a considerable amount of just-in-time (runtime) processing that was necessary in prior art systems because the connection block of the present invention can be used repeatedly for many connections.

Figure 6:
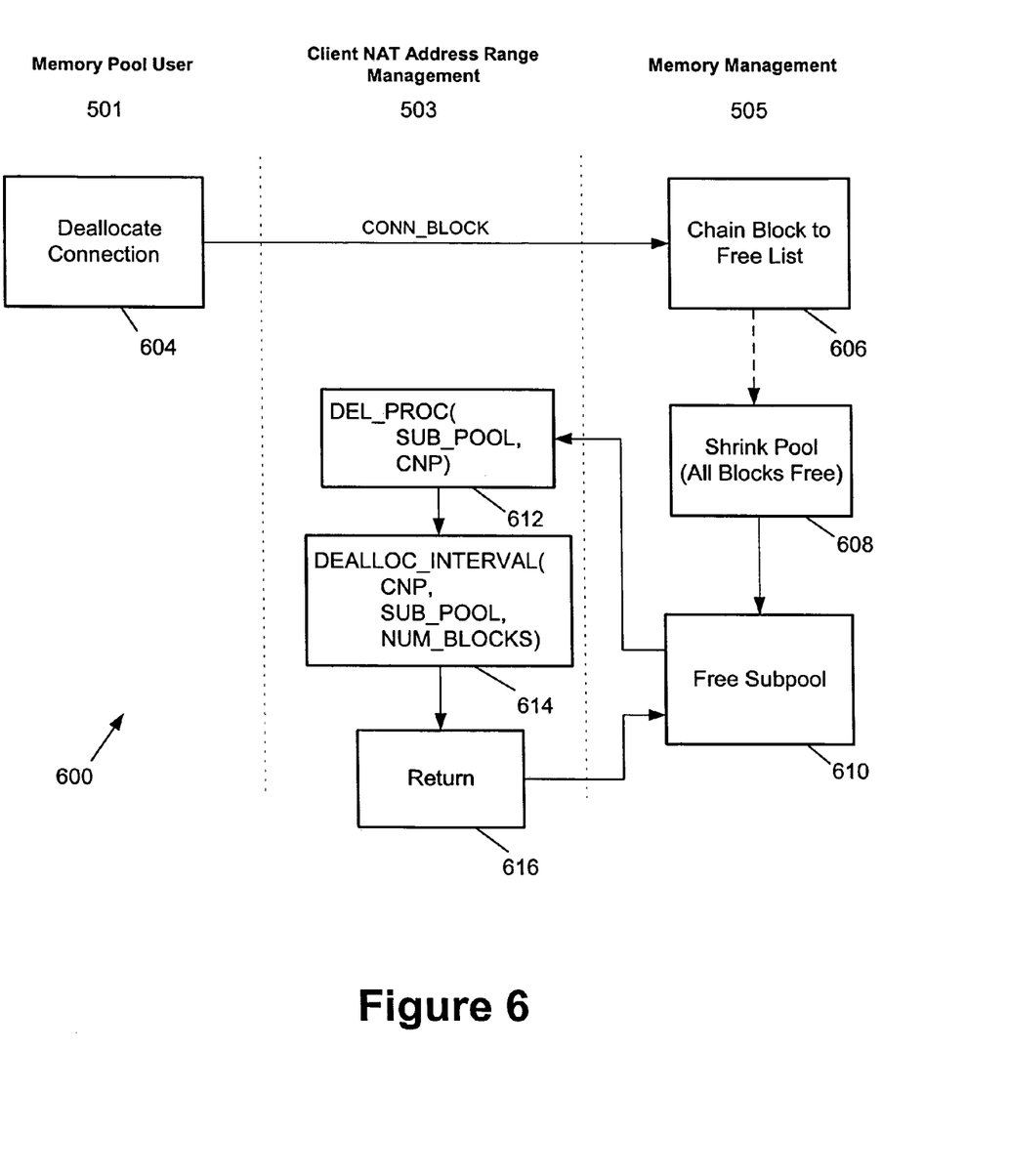
FIG. 6 is a block diagram of a memory deallocation method of an embodiment of the present invention.

FIG. 6 illustrates the memory deallocation method 600 of another embodiment of the present invention. When the server load balancer has finished with the connection, it calls the memory manager's deallocation connection procedure to free the block in step 604. Next, in step 606, the chain block in question is put on the free list. However, because the client NAT address is retained in the block, the memory is not actually freed at this time. Execution of the method proceeds to step 608 where a background process checks to determine if the memory pool needs to be reduced. A reduction is warranted if all the blocks in the subpool are free and the pool is shrunk in step 608.

All of the blocks in the subpool are freed in step 610 of FIG. 6. When all of the blocks in the subpool memory are freed, the subpool is deleted and the memory is returned to the operating system. Specifically, the procedure of step 610 calls the delete procedure ("DEL_PROC") in step 612 to clean up and recover any associated resources. As mentioned previously, the DEL_PROC procedure was passed during allocation of the memory pool in step 512 of FIG. 5. During the DEL_PROC procedure of step 612, a pointer to the subpool memory (header) "SUB_POOL" is passed along with the pointer to the client NAT address range configuration. In addition, the DEL_PROC procedure of step 612 calls the illustratively labeled DEALLOC_INTERVAL procedure of step 614, wherein all of the client NAT addresses assigned to the memory blocks in the subpool are marked free because the subpool memory is actually freed. During step 614, the specific interval list element (ILE) 718 is located by searching the interval list 318 for an entry with a subpool pointer 724 that matches the address of the deleted subpool; such a subpool pointer 724 in the interval list element 718, the subpool pointer 724 is then set to zero; and if interval list elements on either side of the current interval list element 718 are also free, the interval list elements are coalesced and an interval list element 718 is freed for each coalesce action. This is possible because the sequence of elements in the interval list addresses 318 is ordered by client NAT address. Thereafter, control is returned to the memory manager 505 (of FIG. 5) in step 616.

The present invention, therefore, is well adapted to carry out the objects and attain both the ends and the advantages mentioned, as well as other benefits inherent therein. While the present invention has been depicted, described, and is defined by reference to particular embodiments of the invention, such references do not imply a limitation on the invention, and no such limitation is to be inferred. The invention is capable of considerable modification, alternation, alteration, and equivalents in form and/or function, as will occur to those of ordinary skill in the pertinent arts. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A computer system for a client network address translation (NAT) pool, said computer system comprising:
   a memory pool operable to store client NAT addresses, each client NAT address being associated with an identity of an entity on a network;
   a control block, said control block constructed and arranged to contain at least one parameter, said control block containing an address for said memory pool, said control block identifying client NAT addresses for the computer system determined prior to allocation of said memory pool;
   wherein said memory pool includes a pool header having a pointer; and
   wherein said memory pool includes at least one subpool header, said subpool header being pointed to by said pointer of said pool header, said at least one subpool header having a pointer to a subsequent subpool header in said memory pool, said subpool header being associated with a subpool memory within said memory pool, said subpool memory having a plurality of connection blocks, each connection block being populated with a particular one of said client NAT addresses as allocated by said control block;
   wherein an individual client NAT address may be either free or allocated, but client NAT addresses remain allocated in said subpool memory until all of said client NAT addresses in said connection blocks of said subpool memory are free.

2. A system as in claim 1, wherein said control block has pool name property.

3. A system as in claim 1, wherein said control block has a first IP address property.

4. A system as in claim 1, wherein said control block has a last IP address property.

5. A system as in claim 1, wherein said control block has a net mask property.

6. A system as in claim 1, wherein said control block has a memory pool address property.

7. A system as in claim 1, wherein said control block has an initial number of connection blocks property.

8. A system as in claim 1, wherein said control block has a maximum number of connection blocks property.

9. A system as in claim 1, wherein said control block has an interval list address.

10. A system as in claim 9, wherein said interval list address has at least one interval list element.

11. A system as in claim 10, wherein said interval list element has a pointer to a next interval list element.

12. A system as in claim 10, wherein said interval list element has a pointer to a previous interval list element.

13. A system as in claim 10, wherein said interval list element has a pointer to the allocated subpool for said interval list element.

14. A system as in claim 10, wherein said interval list element has an IP address of a first client NAT address in said interval list element.

15. A system as in claim 10, wherein said interval list element has a port number of a first client NAT address in said interval list element.

16. A system as in claim 10, wherein said interval list element has an IP address of a last client NAT address in said interval list element.

17. A system as in claim 10, wherein said interval list element has a port number of a last client NAT address in said interval list element.

18. A system as in claim 10, wherein said interval list element has count of the number of client NAT addresses in said interval list element.

19. A system for allocating memory for a client network address translation (NAT) pool, comprising:
   means for creating an internal control block that represents a range of client NAT addresses, each client NAT address being associated with an identity of an entity on a network;
   means for creating a main pool header;
   means for allocating at least one subpool header having a subpool memory block containing a plurality of connection blocks, said connection blocks containing particular client NAT addresses of the client NAT address range as allocated from said control block, said subpool header being referenced by said main pool header;
   wherein said particular client NAT addresses remain allocated within said subpool memory until all of said connection blocks in said subpool memory block are freed.

20. A memory allocation system for a computer, said system comprising:
   a memory pool operable to store client network address translation (NAT) addresses, each client NAT address being associated with an identity of an entity on a network;
   a control block, said control block constructed and arranged to contain at least two parameters; one of said parameters for said control block being an address for said memory pool;
   means for accepting user input parameters, said input parameters being contained in said control block; and
   means for creating a client NAT subpool within said memory pool, said means for creating said client NAT subpool including means for allocating a client NAT address range, means for allocating to said client NAT subpool particular addresses within said client NAT address range, means for freeing said particular addresses in said client NAT address range, and means for deallocating said particular addresses in said client NAT address range;
   wherein said particular addresses within said client NAT address range remain allocated within said subpool until all of said particular addresses within said client NAT address range of said client NAT subpool have been freed.

* * * * *